United States Patent
Jeong et al.

(10) Patent No.: US 10,122,212 B2
(45) Date of Patent: Nov. 6, 2018

(54) POWER SUPPLY DEVICE

(71) Applicant: SAMSUNG ELECTRO-MECHANICS CO., LTD., Suwon-Si, Gyeonggi-Do (KR)

(72) Inventors: In Wha Jeong, Suwon-Si (KR); Hak Ryong Kim, Suwon-Si (KR); Hugh Kim, Suwon-Si (KR); Moo Jong Kang, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1026 days.

(21) Appl. No.: 14/473,492

(22) Filed: Aug. 29, 2014

(65) Prior Publication Data

US 2015/0061403 A1    Mar. 5, 2015

(30) Foreign Application Priority Data

Aug. 30, 2013 (KR) .................. 10-2013-0104487
Aug. 25, 2014 (KR) .................. 10-2014-0110978

(51) Int. Cl.
*H02J 50/12* (2016.01)
*H02J 7/02* (2016.01)
*H02J 50/40* (2016.01)
*H02J 50/10* (2016.01)
*H02J 5/00* (2016.01)
*H01F 38/14* (2006.01)
*H02J 17/00* (2006.01)

(52) U.S. Cl.
CPC .............. *H02J 50/12* (2016.02); *H02J 5/005* (2013.01); *H02J 7/02* (2013.01); *H02J 7/025* (2013.01); *H02J 50/10* (2016.02); *H02J 50/40* (2016.02); *H01F 38/14* (2013.01); *H02J 17/00* (2013.01)

(58) Field of Classification Search
None
See application file for complete search history.

(56) References Cited

U.S. PATENT DOCUMENTS 6,370,043 B1    4/2002 Yasumura
2002/0012257 A1    1/2002 Takahama et al.
(Continued)

FOREIGN PATENT DOCUMENTS

CN    1739218 A    2/2006
CN    102362408 A    2/2012
(Continued)

OTHER PUBLICATIONS

Korean Office Action dated May 23, 2017, in corresponding Korean Application No. 10-2015-010887 (5 pages in English, 5 pages in Korean).
(Continued)

*Primary Examiner* — Thienvu Tran
*Assistant Examiner* — David M Stables
(74) *Attorney, Agent, or Firm* — NSIP Law

(57) ABSTRACT

A power supply device may be capable of wirelessly transmitting power at a plurality of resonance frequencies. The power supply device may include: a power conversion unit converting input power into first power; and a wireless power supply unit varying a switching frequency for switching the first power and wirelessly transmitting the switched first power at at least one of a plurality of resonance frequencies.

12 Claims, 20 Drawing Sheets

(56) References Cited

U.S. PATENT DOCUMENTS

| 2010/0109443 A1* | 5/2010 | Cook ............... H01Q 1/2225 307/104 |
| --- | --- | --- |
| 2011/0018360 A1 | 1/2011 | Baarman et al. |
| 2012/0001485 A1 | 1/2012 | Uchida |
| 2013/0026850 A1 | 1/2013 | Throngnumchai et al. |
| 2013/0076306 A1 | 3/2013 | Lee et al. |
| 2013/0127405 A1 | 5/2013 | Scherer et al. |
| 2013/0147273 A1 | 6/2013 | Van der lee et al. |
| 2013/0214612 A1 | 8/2013 | Bae |

FOREIGN PATENT DOCUMENTS

| CN | 102640379 A | 8/2012 |
| --- | --- | --- |
| EP | 1 686 647 A1 | 8/2006 |
| EP | 2 416 470 A1 | 8/2012 |
| EP | 2670023 A1 | 12/2013 |
| EP | 2 457 298 B1 | 11/2016 |
| JP | 11-188113 A | 7/1999 |
| JP | 2000-324831 A | 11/2000 |
| JP | 2011-229360 A | 11/2011 |
| JP | 2013-500692 A | 1/2013 |
| JP | 2013-110915 A | 6/2013 |
| JP | 2013-172640 A | 9/2013 |
| KR | 2001-0112593 A | 12/2001 |
| KR | 2009-0115407 A | 11/2009 |
| KR | 10-2012-0028543 A | 3/2012 |
| KR | 10-2013-0005571 A | 1/2013 |
| KR | 10-2013-0054897 A | 5/2013 |
| KR | 10-2013-0066491 A | 6/2013 |
| KR | 2014-0024194 A | 2/2014 |
| WO | WO 2010/116441 | 10/2010 |
| WO | WO 2011/011681 A2 | 1/2011 |
| WO | 2012/101907 A1 | 8/2012 |
| WO | WO 2013/081995 A2 | 6/2013 |

OTHER PUBLICATIONS

European Search Report issued in European Application No. 14275179.1 dated Feb. 12, 2015.
Korean Office Action dated Aug. 1, 2017, in corresponding Korean Application No. 10-2015-0108879 (5 pages in English, 4 pages in Korean).
Korean Office Action dated Feb. 6, 2017, in counterpart of Korean Application No. 10-2015-0108877 (10 pages in English, 7 pages in Korean).
Korean Office Action dated Dec. 1, 2016, in counterpart Korean Appliction No. 10-2015-0108877 (16 pages in English, 10 pages in Korean).
Japanese Office Action dated Apr. 4, 2017 in corresponding Japanese Patent Application No. 2014-176013 (4 pages in English, 2 pages in Japanese).
Chinese Office Action dated Apr. 5, 2017 in corresponding Chinese Patent Application No. 201410440709.3 (29 pages in English and 18 pages in Chinese).
Japanese Office Action dated Oct. 18, 2016 in Japanese Patent Application No. 2014-176013 (9 pages with English translation).
Notice of Office Action dated Oct. 7, 2014 issued in Korean Patent Application No. 10-2014-0110978 (English translation).

* cited by examiner

POWER SUPPLY DEVICE

CROSS-REFERENCE TO RELATED APPLICATION

This application claims the benefit of Korean Patent Application Nos. 10-2013-0104487 filed on Aug. 30, 2013 and 10-2014-0110978 filed on Aug. 25, 2014, with the Korean Intellectual Property Office, the disclosures of which are incorporated herein by reference.

BACKGROUND

The present disclosure relates to a power supply apparatus supplying power wirelessly or wiredly and wirelessly.

An electrical or electronic device refers to a device operated using electricity as an energy source thereof.

In order to operate an electrical or electronic device, electrical power, providing energy required for operating such a device, needs to be supplied, and unless a device generates power by itself to be self-powering, a device is inevitably provided with electrical power from an external source.

In this regard, in order for an electrical or electronic device to receive electrical power from an external source, a power supply apparatus is required to provide electrical power to the electrical or electronic device from external power supply facilities.

In general, as power supply devices, wired power supply devices directly connected to electronic devices through the medium of a connector, for example, and supplying power to a battery installed in electronic devices are largely used. However, wired power supply devices involve various restrictions due to cables for supplying power used therewith.

Thus, as disclosed in the related art document below, power may be supplied to a battery installed in an electronic device in a non-contact manner through a magnetic induction effect or a magnetic resonance effect.

However, the related art power supply device supplies power wirelessly based on either a magnetic induction effect or a magnetic resonance effect, so it cannot easily supply power to wide range of devices, and in particular, it is difficult to supply a plurality of devices with power simultaneously.

RELATED ART DOCUMENT (Patent Document 1) Korean Patent Laid-Open Publication No. 2013-0054897

SUMMARY

An exemplary embodiment in the present disclosure may provide a power supply device capable of wirelessly transmitting power at a plurality of resonance frequencies.

According to an exemplary embodiment in the present disclosure, a power supply device may include: a power conversion unit converting input power into first power; and a wireless power supply unit varying a switching frequency for switching the first power and wirelessly transmitting the switched first power at at least one of a plurality of resonance frequencies.

BRIEF DESCRIPTION OF DRAWINGS

The above and other aspects, features and other advantages in the present disclosure will be more clearly understood from the following detailed description taken in conjunction with the accompanying drawings, in which.

DETAILED DESCRIPTION

Figure 1A:
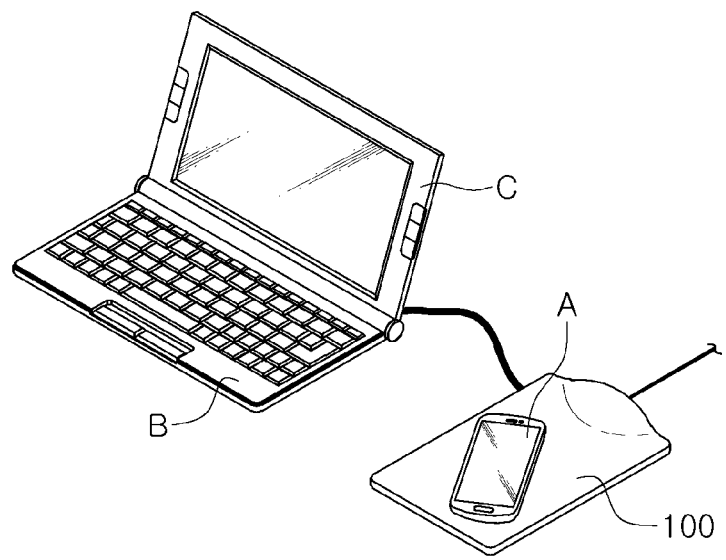
FIGS. 1A through 1E are views illustrating utilization examples of a power supply device according to an exemplary embodiment in the present disclosure.
Figure 1B:
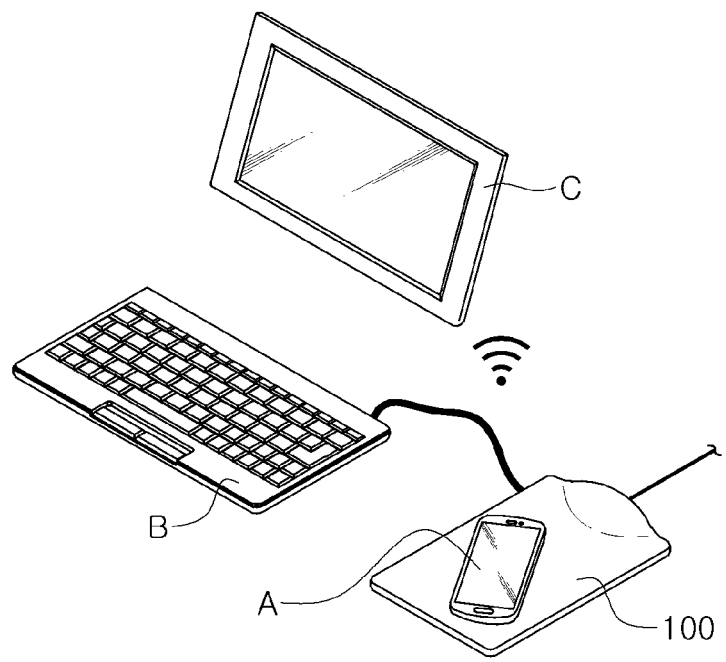
Figure 1C:
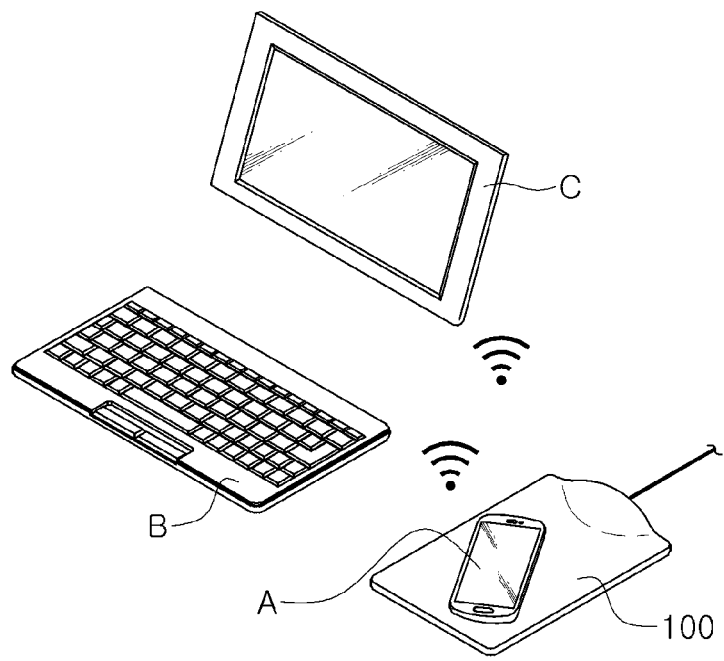
Figure 1D:
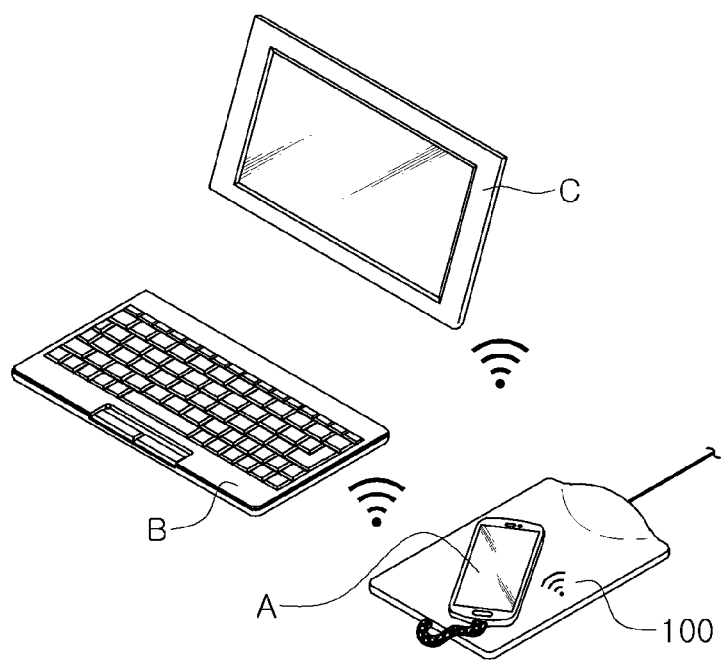
Figure 1E:
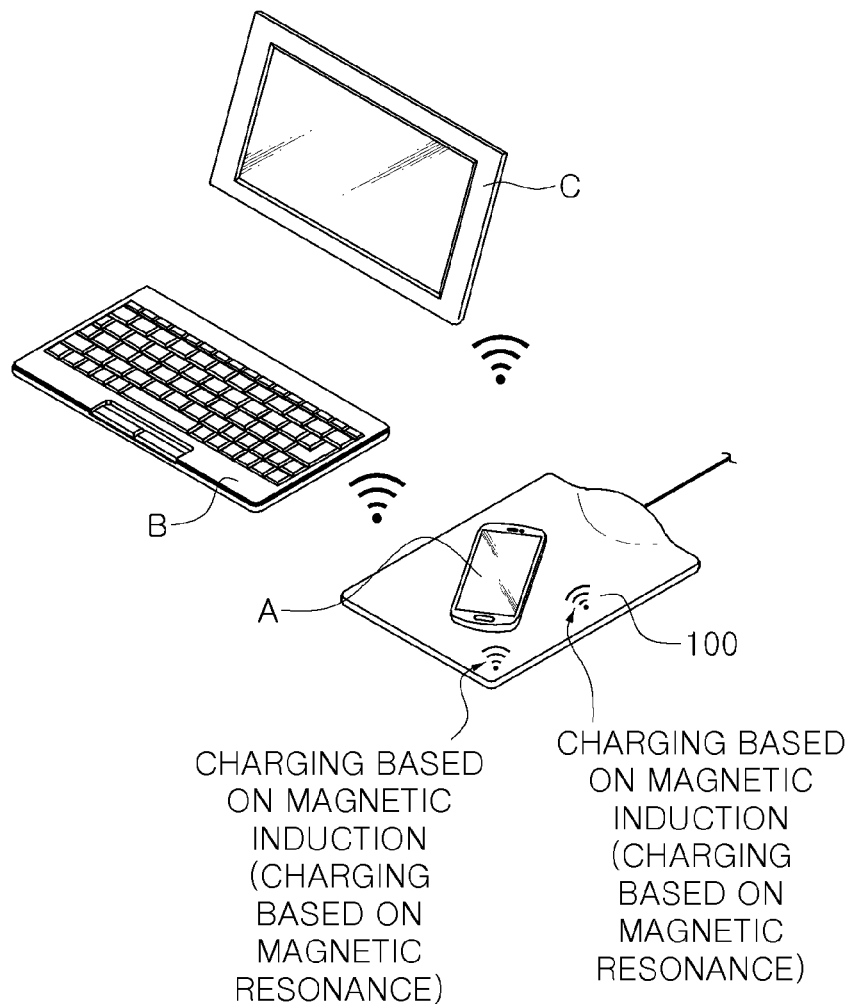

Hereinafter, exemplary embodiments in the present disclosure will be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

It will be understood that when an element is referred to as being "connected to" another element, it can be directly connected to the other element or intervening elements may also be present. In contrast, when an element is referred to as being "directly connected to" another element, no intervening elements are present.

In addition, unless explicitly described to the contrary, the word "comprise" and variations such as "comprises" or "comprising," will be understood to imply the inclusion of stated elements but not the exclusion of any other elements.

FIGS. 1A through 1E are views illustrating utilization examples of a power supply device according to an exemplary embodiment in the present disclosure.

Referring to FIGS. 1A through 1E, a power supply device 100 may be a power supply device supplying power wiredly. While supplying power to a laptop computer B and C wiredly, the power supply device 100 may simultaneously supply power to a cellular phone A wirelessly. In this case, the power supply device 100 according to an exemplary embodiment in the present disclosure may be a wireless charging pad supplying power to the cellular phone A wirelessly.

In a case in which a body B and a display C of the laptop computer (B and C) are separated, the power supply device 100 may supply power to the display C wirelessly, while supplying power to the body B wiredly. Also, the power supply device 100 may supply power to both the body B and the display C wirelessly.

Moreover, the power supply device 100 may supply power to the cellular phone A in a wired manner, via a magnetic resonance method or via a magnetic induction method in order to perform quick charging or to supplement insufficient power.

In a case in which a plurality of power transmission coils are provided, the plurality of power transmission coils may supply power wirelessly according to the magnetic resonance method or the magnetic induction method, and in this case, all of the plurality of power transmission coils may transmit power to the body B and the display C, as well as to the cellular phone A, according to the magnetic resonance method or the magnetic induction method.

Hereinafter, a configuration of the power supply device 100 will be described with reference to the accompanying drawings.

Figure 2A:
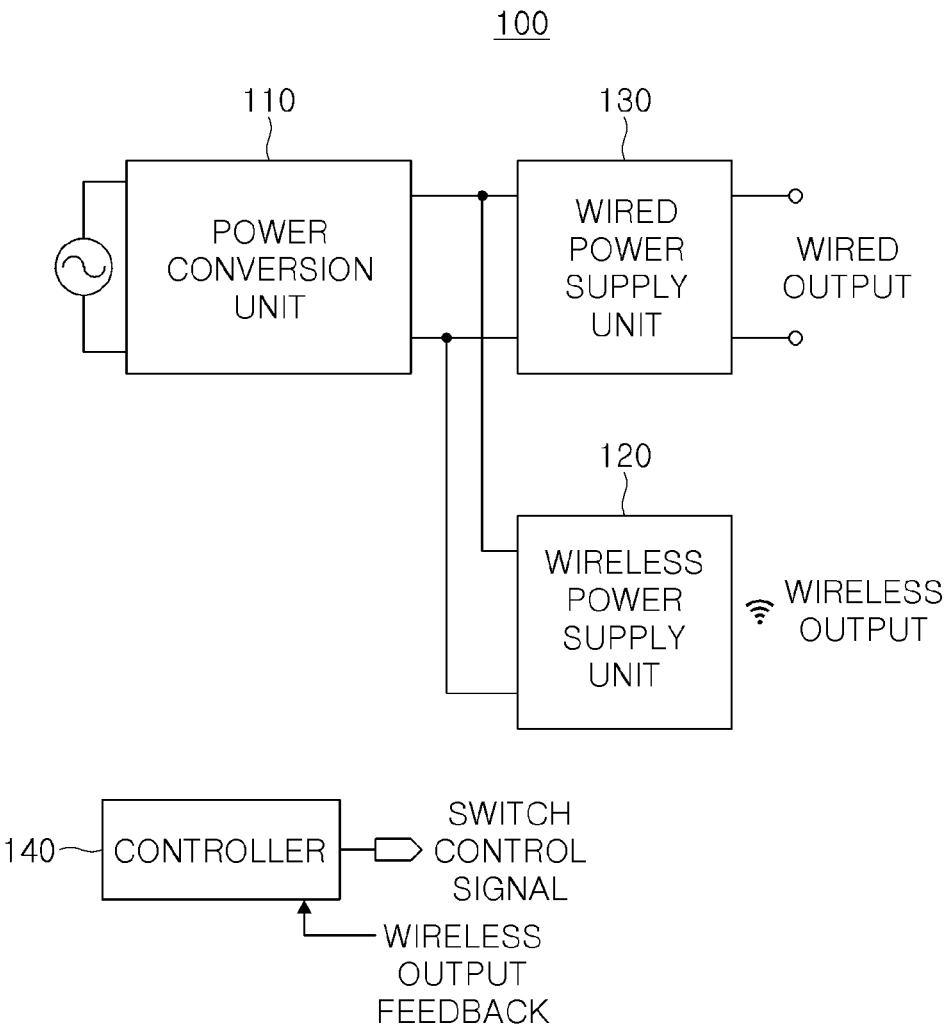
FIGS. 2A and 2B are block diagrams illustrating schematic examples of a power supply device according to an exemplary embodiment of the present disclosure.
Figure 2B:
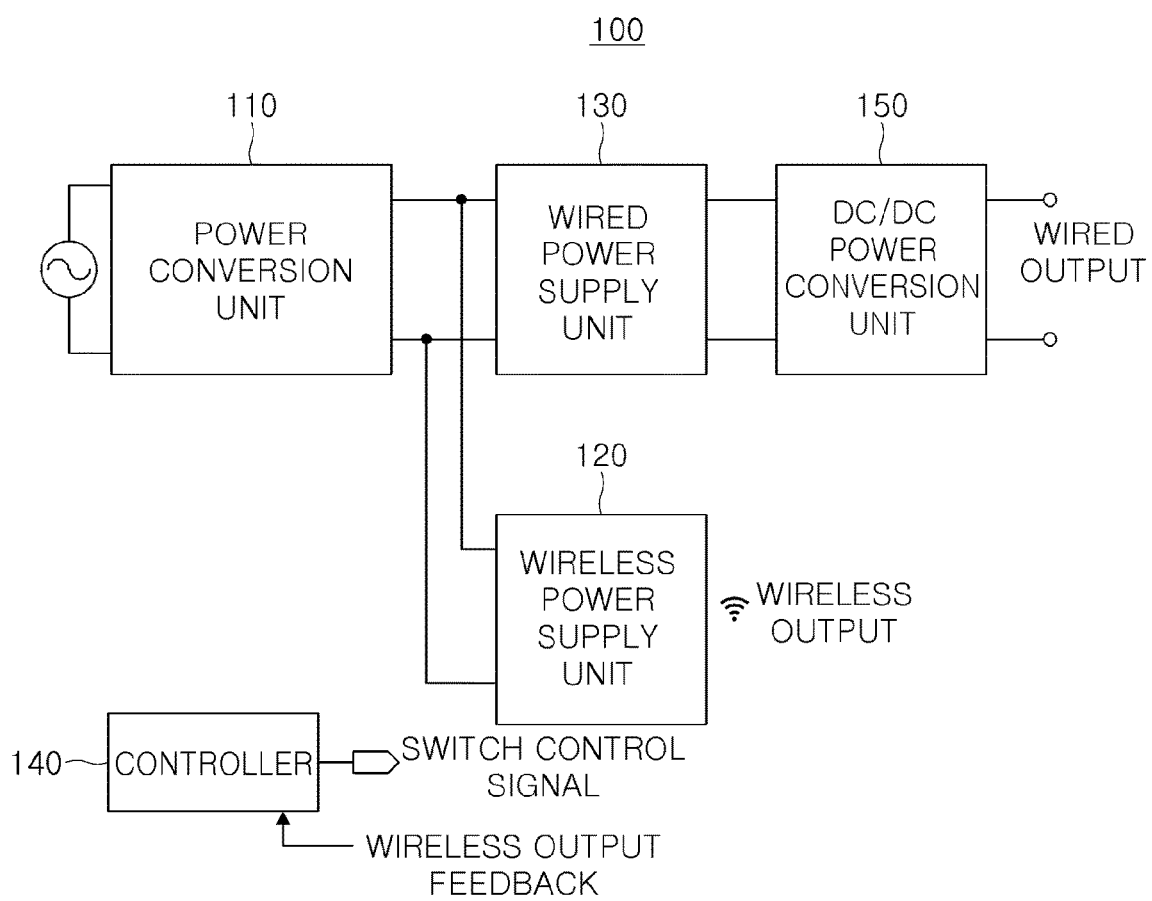

FIGS. 2A and 2B are block diagrams illustrating schematic examples of a power supply device according to an exemplary embodiment in the present disclosure.

Referring to FIGS. 2A and 2B, the power supply device 100 according to the exemplary embodiment in the present disclosure may include a power conversion unit 110 converting input power or alternating current (AC) power into first power and a wireless power supply unit 120 switching the first power from the power conversion unit 110 and wirelessly transmitting the first power. The power supply device 100 may further include a wired power supply unit 130 transmitting the first power from the power conversion unit 110 wiredly and a controller 140 controlling wireless transmission of the wireless power supply unit 120.

In addition, the power supply device 100 may further include a DC/DC power conversion unit 150 performing a DC/DC conversion on power transmitted to the wired power supply unit 130.

Figure 3:
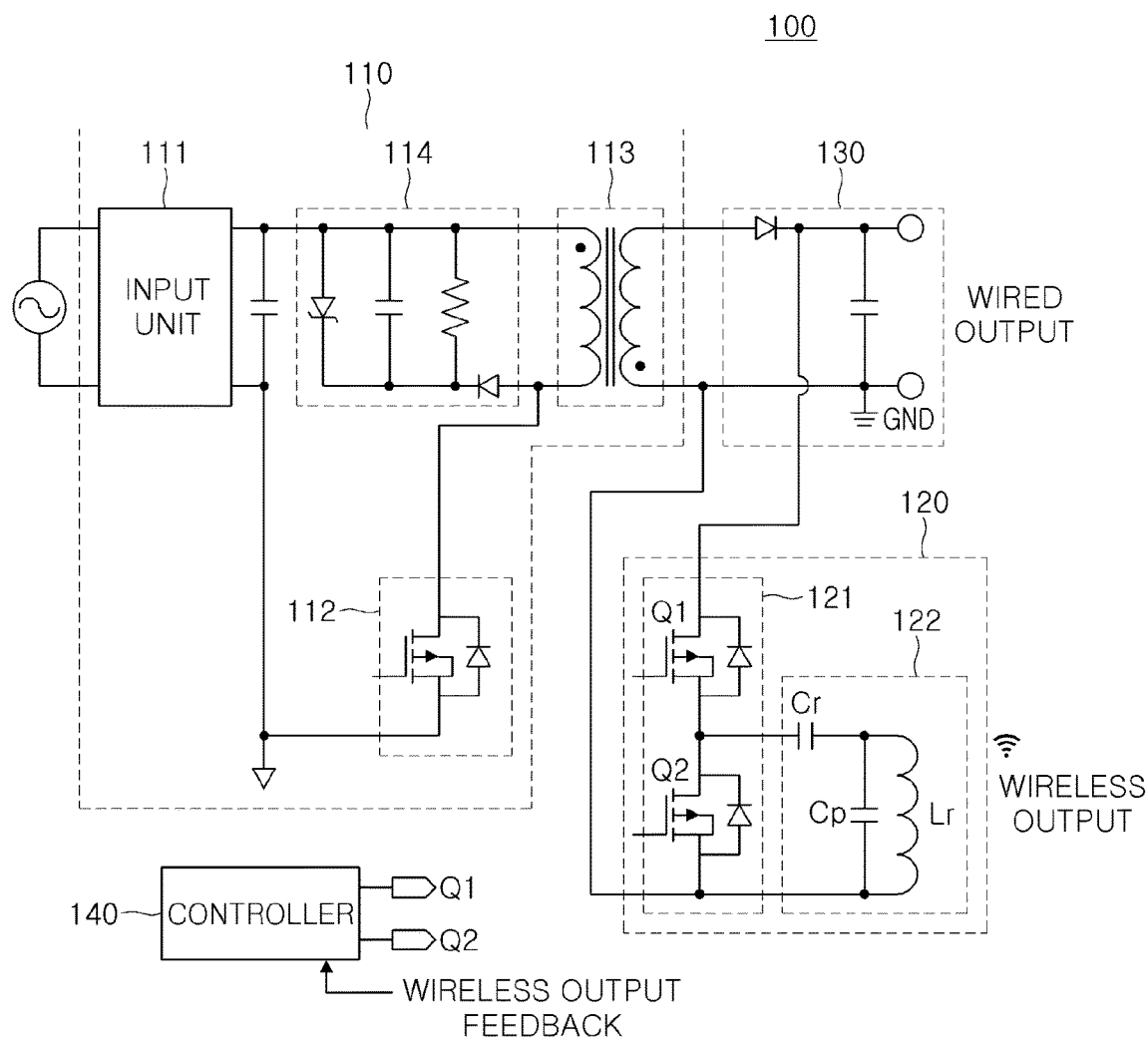
FIG. 3 is a circuit diagram schematically illustrating a first embodiment of a power supply device according to the present disclosure.

FIG. 3 is a circuit diagram schematically illustrating a first embodiment of a power supply device according to the present disclosure.

Referring to FIG. 3, the first embodiment 100 of a power supply device according to the present disclosure may include a power conversion unit 110 and a wireless power supply unit 120. In addition, the power supply device 100 according to an exemplary embodiment in the present disclosure may further include a wired power supply unit 130 and a controller 140.

The power conversion unit 110 may include an input unit 111, a power switching unit 112, a transformer 113, and a peripheral circuit 114.

The input unit 111 may rectify input AC power or suppress electromagnetic interference. Rectified power may be switched by the power switching unit 112. The transformer 113 may include a primary winding and a secondary winding which are mutually insulated and magnetically coupled.

The primary winding may receive switched power, and the secondary winding may transform the switched power input to the primary winding according to a winding ratio with the primary winding and output first power. The peripheral circuit 114 may perform power stabilization and snubber operations when the power switching unit 112 switches power.

The wireless power supply unit 120 may include a switching unit 121 and a resonance unit 122.

The switching unit 121 may include at least one switch Q1 and Q2, and may be a half bridge switch having the first switch Q1 and the second switch Q2.

The resonance unit 122 may include a first capacitor Cr, a second capacitor Cp, and a first power transmission coil Lr.

The first and second switches Q1 and Q2 of the half bridge switch may switch the first power from the power conversion unit 110 on and off complementarily, and the resonance unit 122 may resonate according to a switching frequency of the half bridge switch and may resonate at at least one of two resonance frequencies. Here, the resonance frequency may work together with the switching frequency of the half bridge switch.

One end of the first capacitor Cr of the resonance unit 122 may be connected to a node between the first switch and the second switch Q2, and the other end of the first capacitor Cr may be connected to the first power transmission coil Lr. The first power transmission coil Lr may be connected between the other end of the first capacitor Cr and a ground, and the second capacitor Cp may be connected to the first power transmission coil Lr in parallel. Here, the second capacitor Cp may have parasitic capacitance of the first power transmission coil Lr, rather than an actual element.

The wired power supply unit 130 may stabilize the first power from the power conversion unit 110 and supply the stabilized power to the outside wiredly.

The controller 140 may vary a switching frequency of the switching unit 121 according to a user selection, and thus, a resonance frequency of the resonance unit 122 may vary. The controller 140 may receive feedback of information regarding an output current of the wireless power supply unit 120 and vary the switching frequency of the switching unit 121.

Figure 4A:
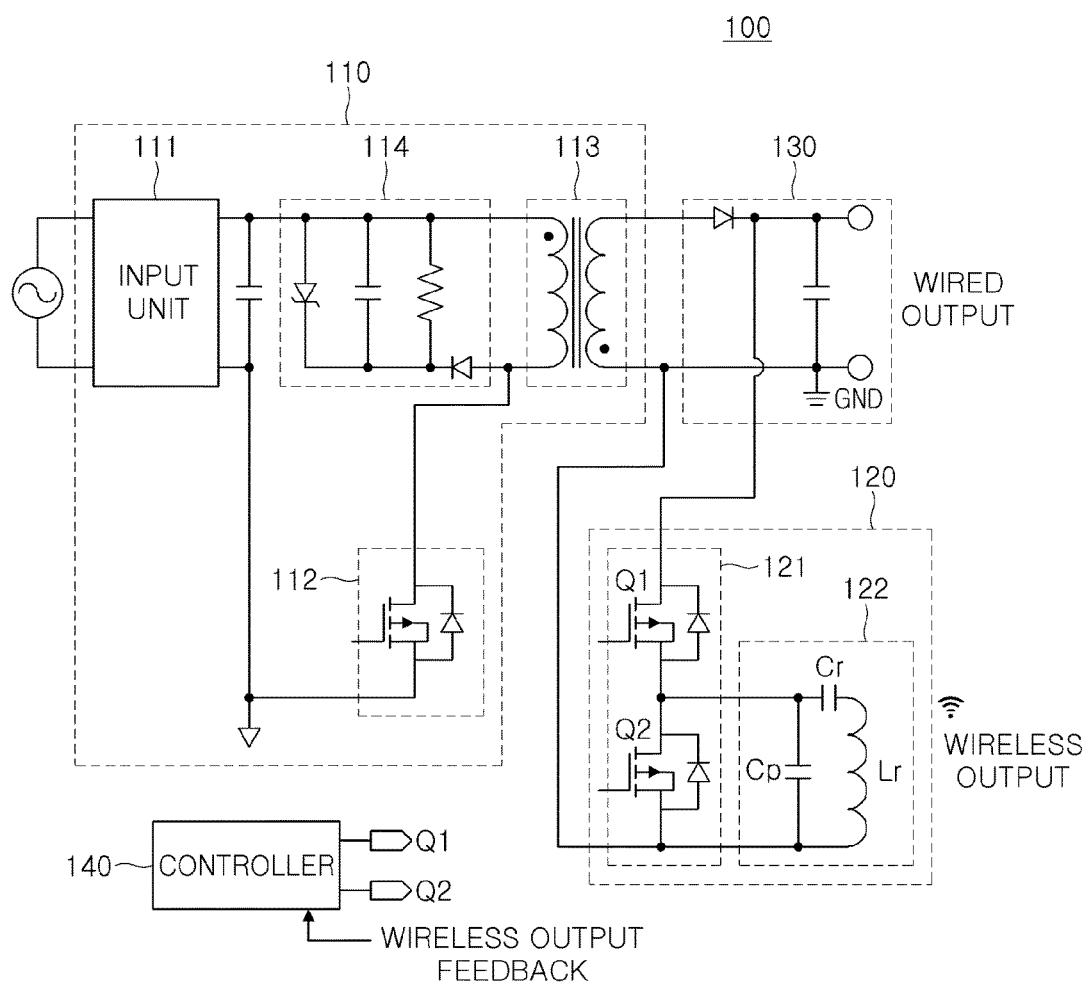
FIGS. 4A and 4B are circuit diagrams schematically illustrating detailed embodiments of resonance units employed in the first embodiment of the power supply device according to the present disclosure.
Figure 4B:
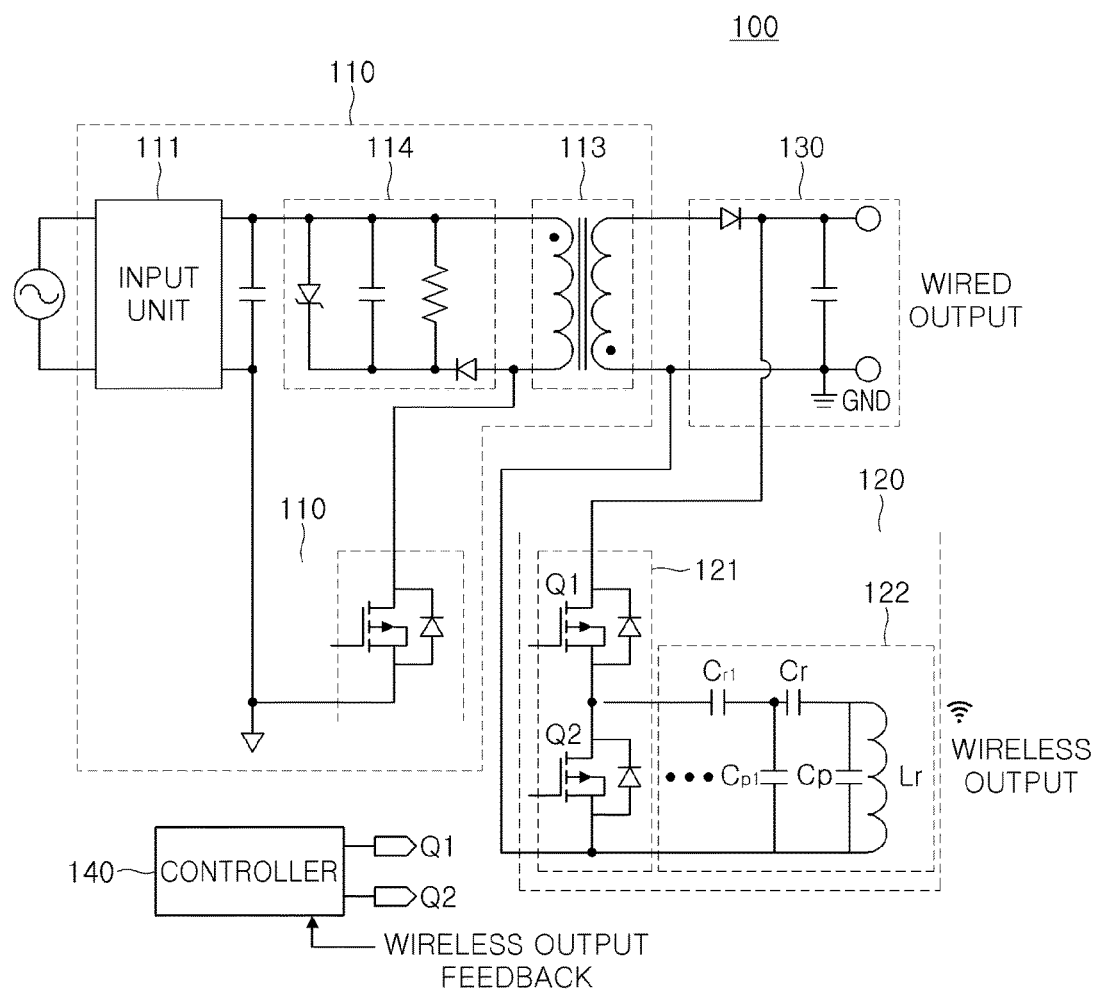

FIGS. 4A and 4B are circuit diagrams schematically illustrating detailed embodiments of resonance units employed in the first embodiment of the power supply device according to the present disclosure.

Referring to FIG. 4A, in a resonance unit 122 employed in the first embodiment 100 of the power supply device in the present disclosure, a second capacitor Cp may be connected to a first power transmission coil Lr in parallel, and a first capacitor Cr may be connected to the second capacitor Cp and the first power transmission coil Lr in series such that one end of the first capacitor Cr is connected to one end of the second capacitor Cp and the other end of the first capacitor Cr is connected the one end of the first power transmission coil Lr.

Figure 12:
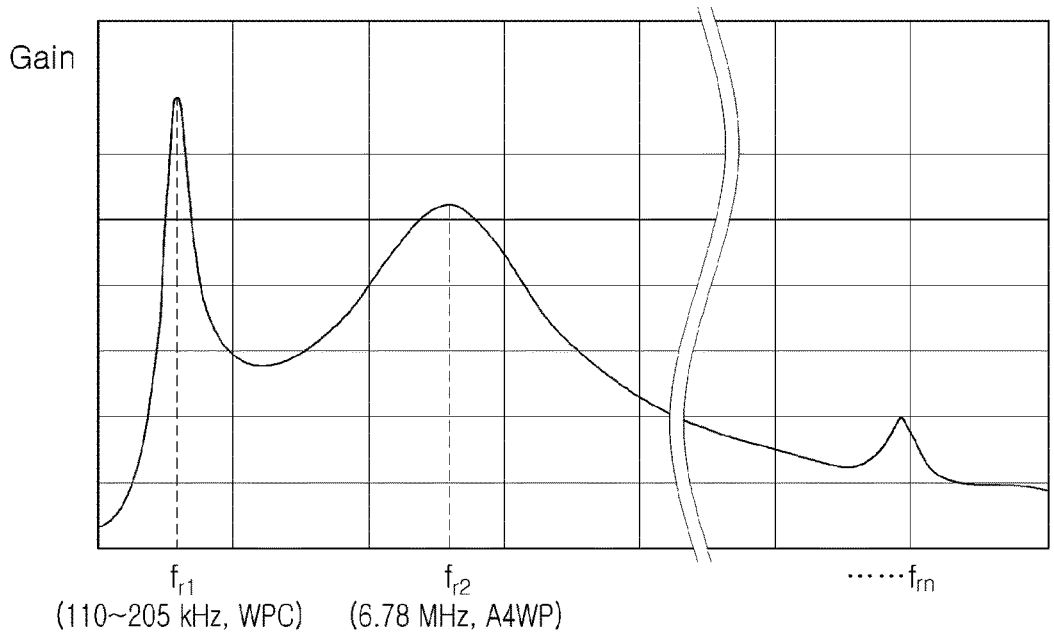
FIG. 12 is a graph illustrating a resonance frequency of the power supply device according to an exemplary embodiment of the present disclosure.

Referring to FIG. 4B, the wireless power supply unit 120 of the first embodiment of the power supply device in the present disclosure may wirelessly transmit power to at least one of resonance frequencies as illustrated in FIG. 12, and thus, in the resonance unit 122 employed in the first embodiment 100 of the power supply device in the present disclosure, a plurality of capacitors including third and fourth capacitors Cr1 and Cp1, in addition to the connectional relationship between the first and second capacitors Cr and Cp, may resonate with the first power transmission coil Lr to form a plurality of resonance frequencies.

Figure 5:
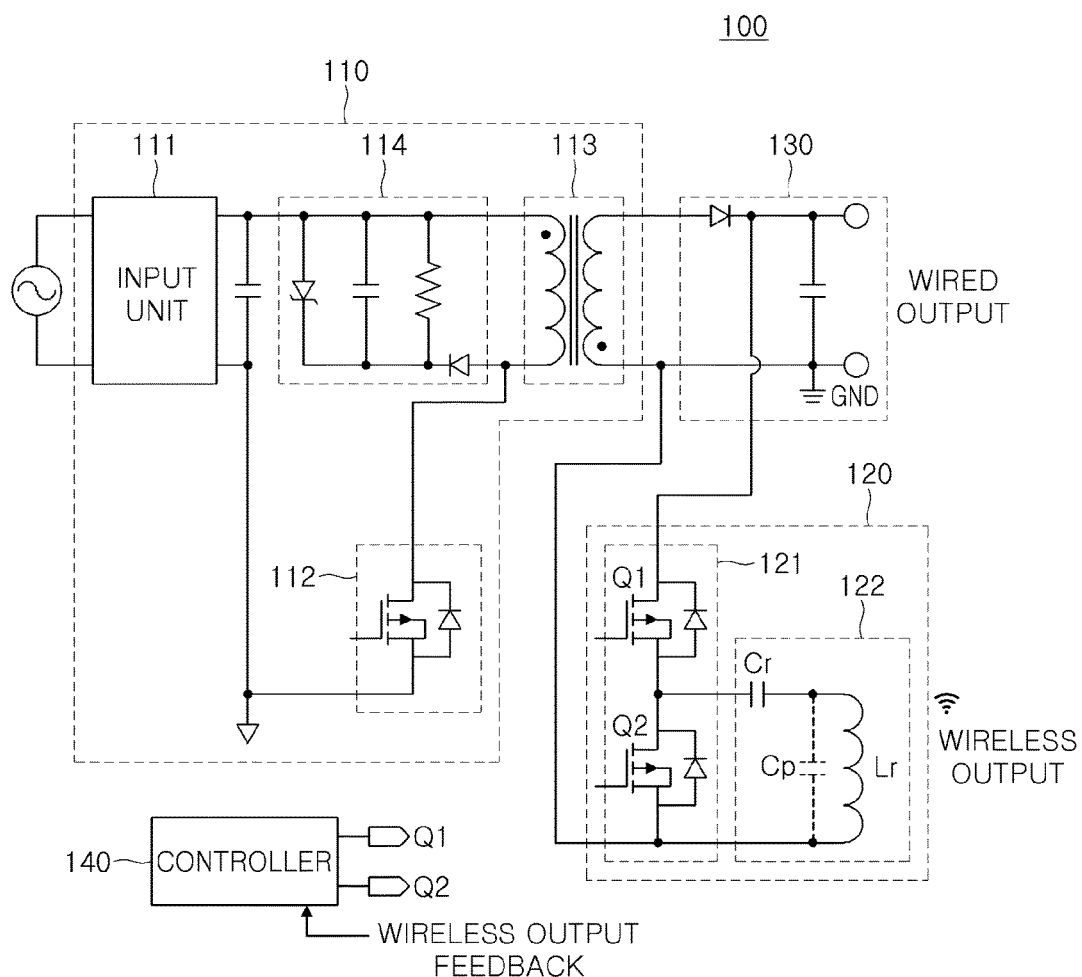
FIGS. 5 and 6 are circuit diagrams schematically illustrating operations of the first embodiment of the power supply device according to the present disclosure.
Figure 6:
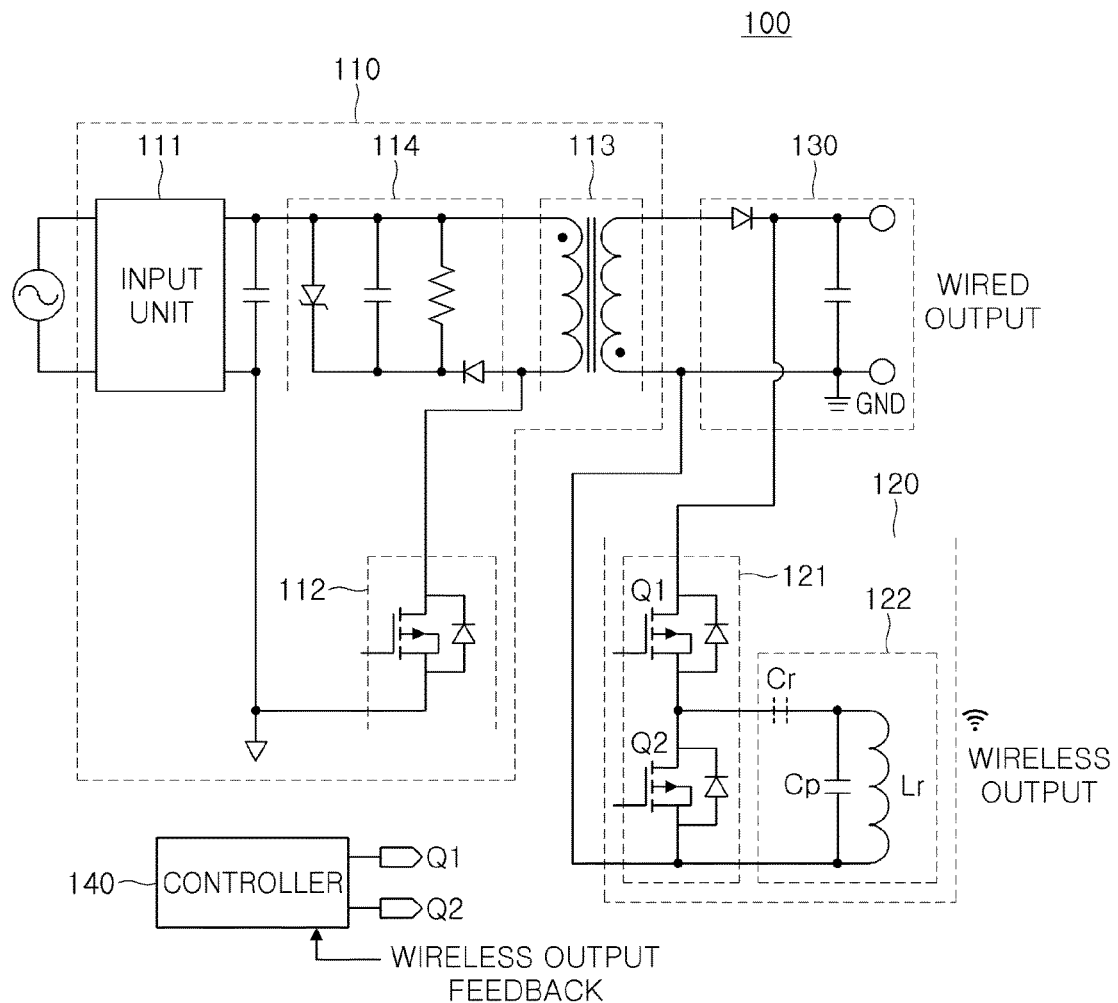

FIGS. 5 and 6 are circuit diagrams schematically illustrating operations of the first embodiment of the power supply device according to the present disclosure.

Referring to FIGS. 5 and 6 together with FIG. 3, the controller 140 may control switching of the switching unit 121 with a first switching frequency, a low switching frequency, and a second switching frequency higher than the first switching frequency, and in a case in which the switching unit 121 switches the first power to the first switching frequency, the first capacitor Cr and the first power transmission coil Lr resonate to wirelessly transmit power at a first resonance frequency as illustrated in FIG. 5.

Here, the first resonance frequency fr1 may be expressed as Equation 1.

$$f_{r1} = \frac{1}{2\pi\sqrt{L_r \cdot C_r}} \quad (1)$$

Meanwhile, in a case in which the switching unit 121 switches the first power to the second switching frequency, the second capacitor Cp and the first power transmission coil Lr may resonate to wirelessly transmit power at the second resonance frequency as illustrated in FIG. 6

Here, the second resonance frequency fr2 may be expressed as Equation 2.

$$f_{r2} = \frac{1}{2\pi\sqrt{L_r \cdot \left(\frac{C_r \cdot C_p}{C_r + C_p}\right)}} \approx \frac{1}{2\pi\sqrt{L_r \cdot C_p}} \quad (2)$$

As described above, the resonance unit 122 may wirelessly transmit power at the first resonance frequency and at the second resonance frequency, and may form at least two resonance frequency bands in one resonant circuit as illustrated in FIG. 12.

For example, the first resonance frequency fr1 may be formed between 110 KHz and 205 KHz according to the Wireless Power Consortium (WPC) standard, and the resonance unit 122 may wirelessly transmit power according to a magnetic induction method.

Meanwhile, the second resonance frequency fr2 may have a frequency of 6.78 MHz according to the Alliance for Wireless Power (A4WP), and the resonance unit 122 may wirelessly transmit power according to a magnetic resonance method.

In addition, a plurality of resonance frequencies fr1, fr2, and frn as described above with reference to FIG. 4.

Figure 7:
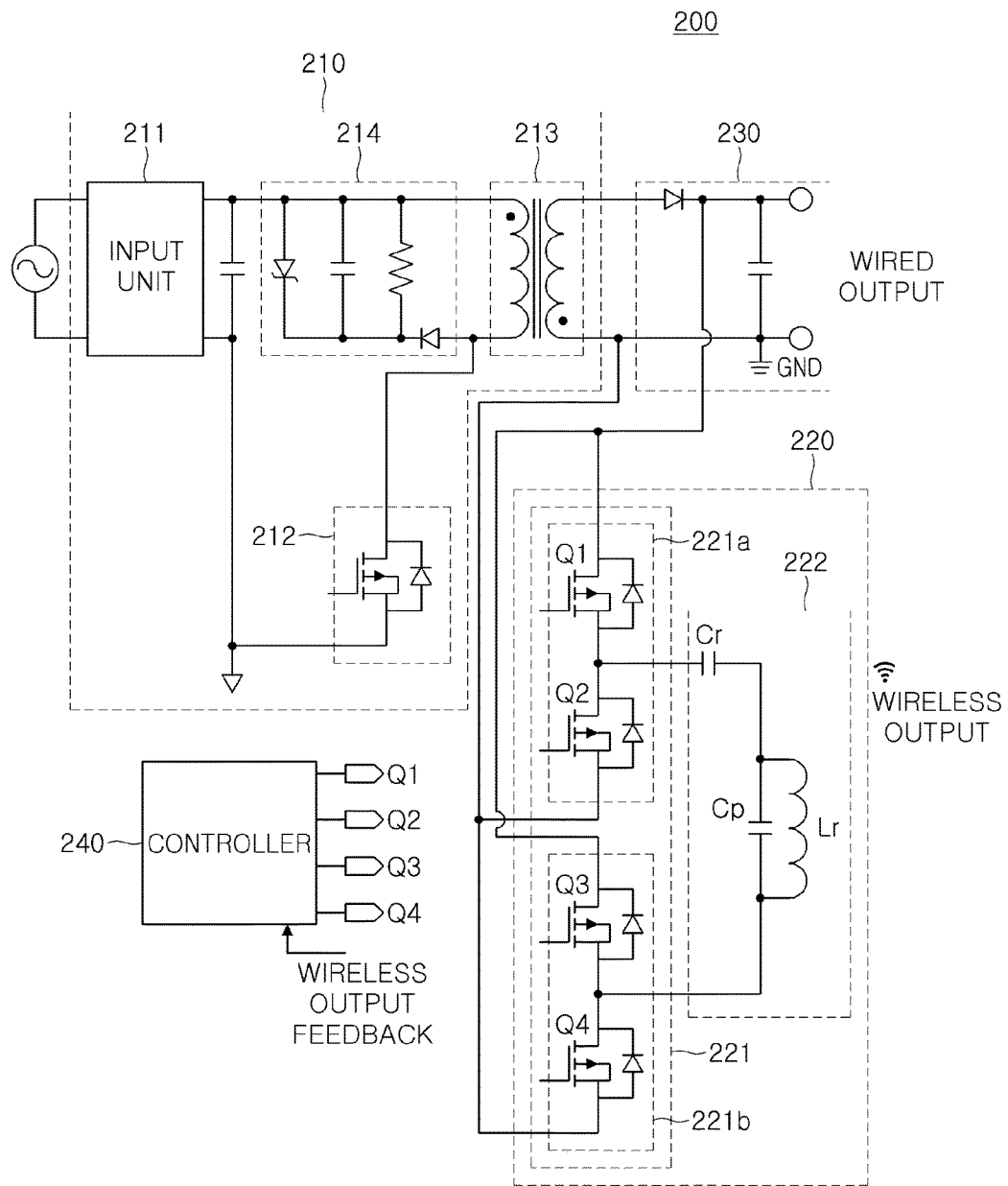
FIGS. 7, 8, and 10 are circuit diagrams schematically illustrating second to fourth embodiments of the power supply device according to the present disclosure.
Figure 8:
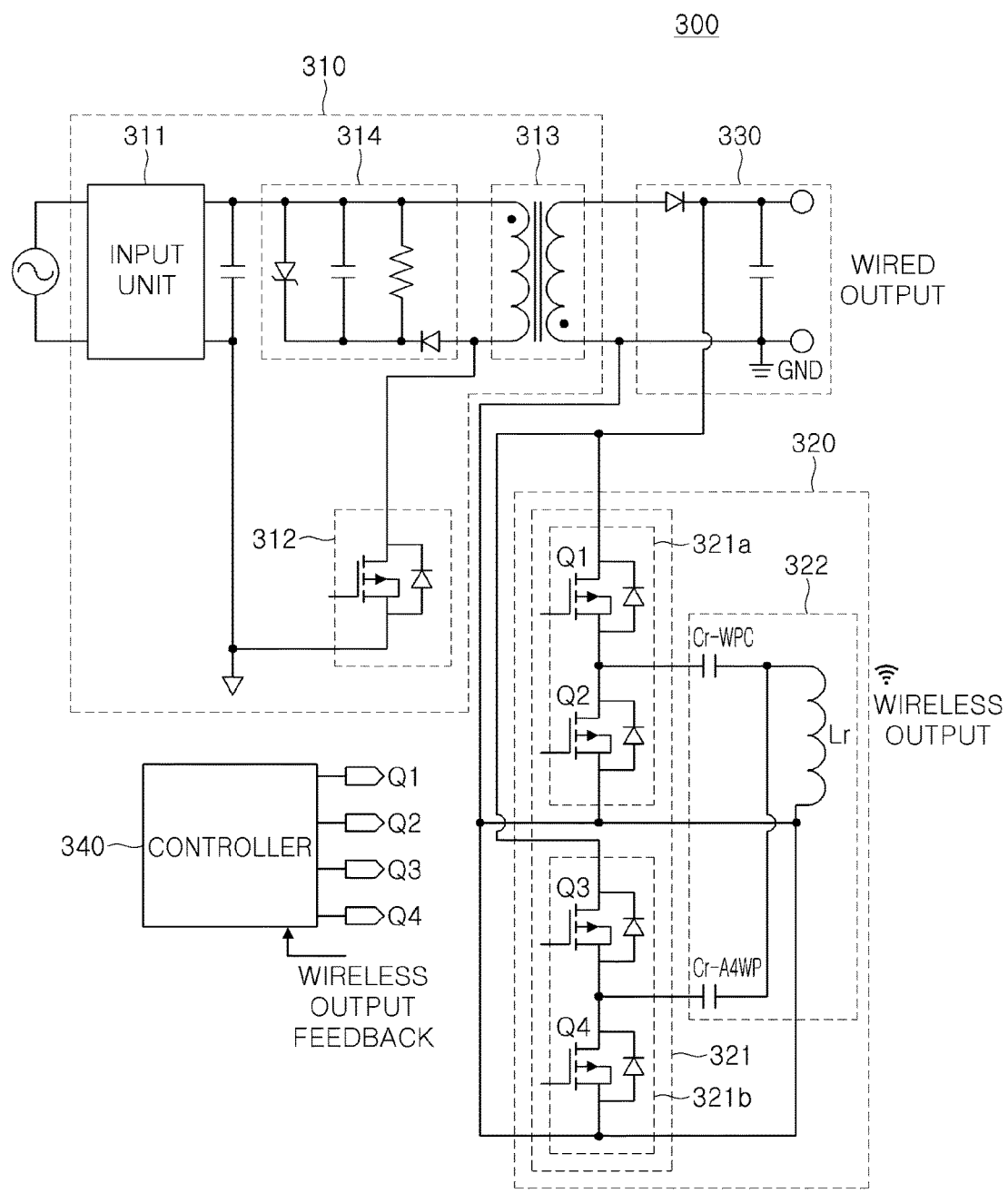
Figure 10:
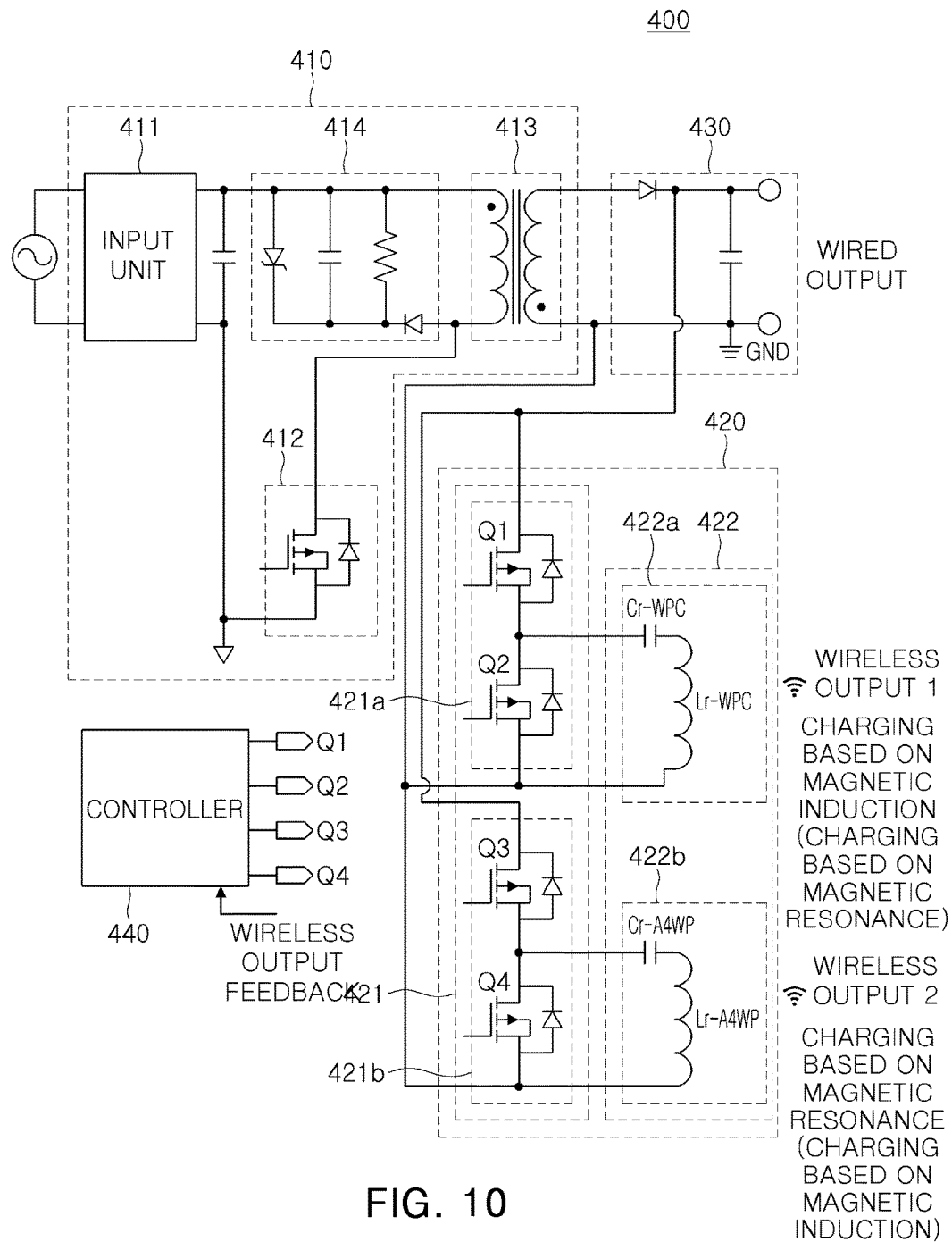

FIGS. 7, 8, and 10 are circuit diagrams schematically illustrating second to fourth embodiments of the power supply device according to the present disclosure.

First, configurations and operations of power conversion units 210, 310, and 410 and wired power supply units 230, 330, and 430 are identical to those of the power conversion unit 110 and the wired power supply unit 130 of FIG. 3, and thus, detailed descriptions thereof will be omitted.

Referring to FIG. 7, in the second embodiment 200 of the power supply device according to the present disclosure, a switching unit 221 of a wireless power supply unit 220 may have first and second half bridge switches 221a and 221b, and the first and second half bridge switches 221a and 221b may receive first power from a power conversion unit 210.

The first half bridge switch 221a may include first and second switches Q1 and Q2, and the second half bridge switch 221b may include third and fourth switches Q3 and Q4.

A resonance unit 222 may include first and second capacitors Cr and Cp and a first power transmission coil Lr. One end of the first capacitor Cr may be connected to a node between the first switch Q1 and the second switch Q2, and the other end of the first capacitor Cr may be connected to the first power transmission coil L4. The first power transmission coil Lr may be connected to the other end of the first capacitor Cr and a node between the third and fourth switches Q3 and Q4 of the second half bridge switch 221b. The second capacitor Cp may be connected to the first power transmission coil Lr in parallel.

The first and second half bridge switches 221a and 221b may form a single full bridge switch, and when the single full bridge switch is formed, a switching control operation of a controller 240 may be different from that when the first and second half bridge switches 221a and 221b operate, separately.

The controller 240 may control switching of the first to fourth switches Q1 to Q4. The first capacitor Cr and the first power transmission coil Lr of the resonance unit 222 resonate according to a switching frequency of the first half bridge switch 221a to wirelessly transmit power at a first resonance frequency, and the second capacitor Cp and the first power transmission coil Lr of the resonance unit 222 may resonate according to a switching frequency of the second half bridge switch 221b to wirelessly transmit power at a second resonance frequency.

Referring to FIG. 8, in the third embodiment 300 of the power supply device according to the present disclosure, a switching unit 321 of a wireless power supply unit 320 may have first and second half bridge switches 321a and 321b, and the first and second half bridge switches 321a and 321b may receive first power from a power conversion unit 310.

The first half bridge switch 321a may include first and second switches Q1 and Q2, and the second half bridge switch 321b may include third and fourth switches Q3 and Q4.

A resonance unit 322 may include first and second capacitors Cr-WPC and Cr-A4WP and a first power transmission coil Lr, and one end of the first capacitor Cr-WPC may be connected to a node between the first switch Q1 and the second switch Q2 of the first half bridge switch 321a, and the other end of the first capacitor Cr-WPC may be connected to the first power transmission coil Lr. The first power transmission coil Lr may be connected to the other end of the first capacitor Cr-WPC and a ground. One end of the second capacitor Cr-A4WP may be connected to a node between the third and fourth switches Q3 and Q4 of the second half bridge switch 321b and the other end of the second capacitor Cr-A4WP may be connected to the first power transmission coil Lr in series together with the other end of the first capacitor Cr-WPC.

A controller 340 may control switching of the first to fourth switches Q1 to Q4. The first capacitor Cr-WPC and the first power transmission coil Lr of the resonance unit 322 may resonate according to a switching frequency of the first half bridge switch 321a to wirelessly transmit power at a first resonance frequency, and the second capacitor Cr-A4WP and the first power transmission coil Lr of the resonance unit 322 may resonate according to a switching frequency of the second half bridge switch 321b to wirelessly transmit power at a second resonance frequency.

Figure 9A:
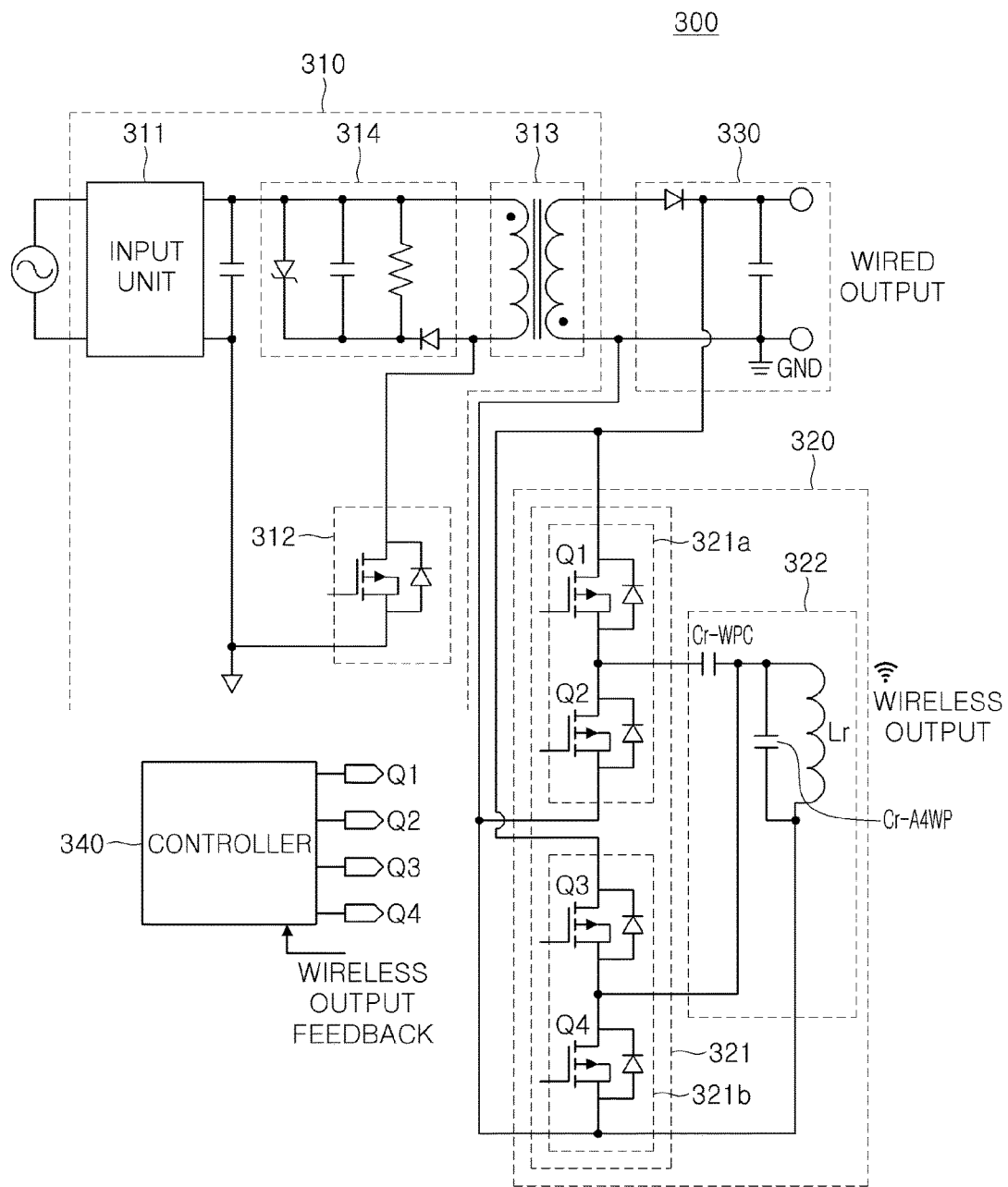
FIGS. 9A through 9C are circuit diagrams schematically illustrating detailed embodiments of resonance units employed in the third embodiment of the power supply device according to the present disclosure illustrated in FIG. 8.
Figure 9B:
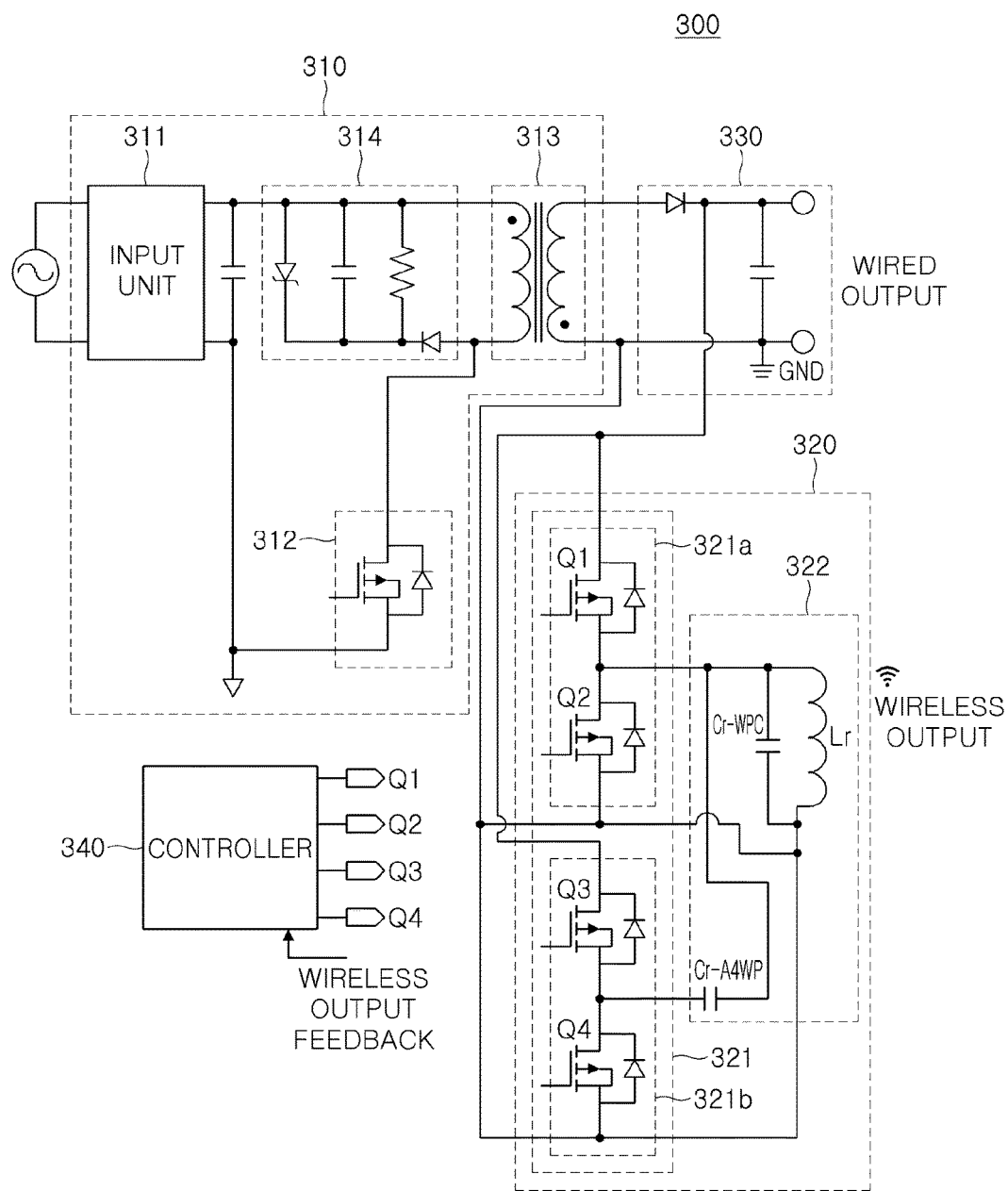
Figure 9C:
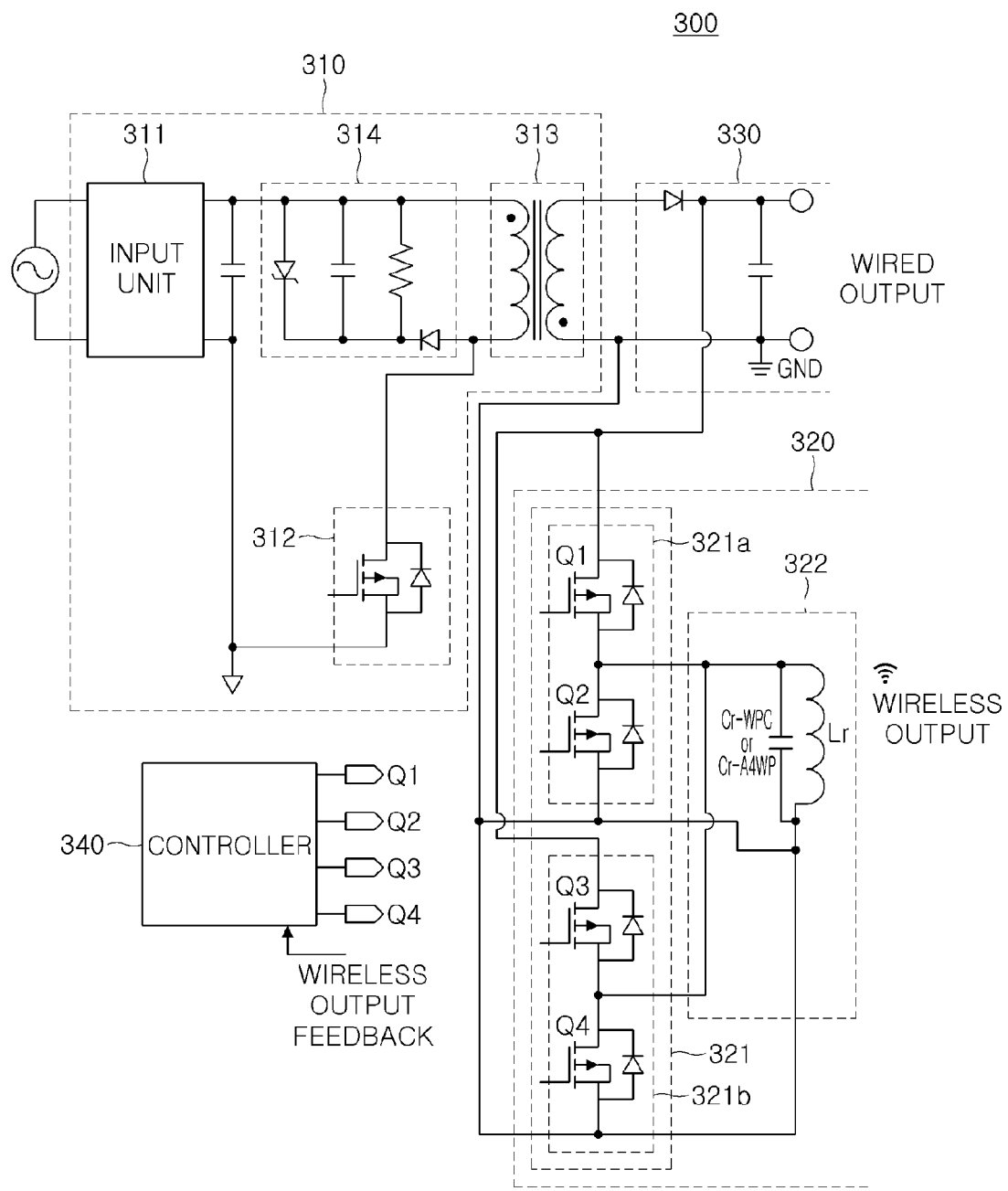

FIGS. 9A through 9C are circuit diagrams schematically illustrating detailed embodiments of resonance units employed in the third embodiment of the power supply device according to the present disclosure illustrated in FIG. 8.

Referring to FIGS. 9A through 9C, in the resonance unit 322 employed in the third embodiment 300 of the power supply device according to the present disclosure illustrated in FIG. 8, the second capacitor Cr-A4WP may be connected to the first power transmission coil L4 in parallel (FIG. 9A), the second capacitor Cr-A4WP may be connected to the first power transmission coil Lr and a node between the third and fourth switches Q3 and Q4 of the second half bridge switch 321b and the first capacitor Cr-WPC may connected to the first power transmission coil Lr in parallel (FIG. 9B), or only one of the first capacitor Cr-WPC and the second capacitor Cr-ArWP may be connected to the first power transmission coil Lr, so as to resonate.

Referring to FIG. 10, in a fourth embodiment 400 of the power supply device according to the present disclosure, a switching unit 421 of a wireless power supply unit 420 may have first and second half bridge switches 421a and 421b, and the first and second half bridge switches 421a and 421b may receive first power from a power conversion unit 410.

The first half bridge switch 421a may include first and second switches Q1 and Q2, and the second half bridge switch 421b may include third and fourth switches Q3 and Q4.

A resonance unit 422 may include first and second resonance units 422a and 422b. The first resonance unit 422a may have a first capacitor Cr-WPC and a first power transmission coil Lr-WPC, and the second resonance unit 422b may include a second capacitor Cr-A4WP and a second power transmission coil Lr-A4WP.

One end of the first capacitor Cr-WPC of the first resonance unit 422a may be connected to a node between the first switch Q1 and the second switch Q2 of the first half bridge switch 421a, and the other end of the first capacitor Cr-WPC may be connected to the first power transmission coil Lr-WPC in series. The first power transmission coil Lr-WPC may be connected the other end of the first capacitor Cr-WPC and a ground.

One end of the second capacitor Cr-A4WP of the second resonance unit 422b may be connected a node between the third and fourth switches Q3 and Q4 of the second half bridge switch 321b, and the other end of the second capacitor Cr-A4WP may be connected to the second power transmission coil Lr-ArWP in series. The second power transmission coil Lr-A4WP may be connected between the other end of the second capacitor Cr-ArWP and a ground.

A controller 440 may control switching of the first to fourth switches Q1 to Q4. The first capacitor Cr-WPC and the first power transmission coil Lr-WPC of the resonance unit 422 may resonate according to a switching frequency of the first half bridge switch 421a to wirelessly transmit power at a first resonance frequency, and the second capacitor Cr-A4WP and the second power transmission coil Lr-A4WP of the resonance unit 422 may resonate according to a switching frequency of the second half bridge switch 421b to wirelessly transmit power at a second resonance frequency.

In addition, the resonance unit 422 may simultaneously transmit power at first and second resonance frequencies wirelessly. Namely, the resonance unit 422 may wirelessly transmit power according to a magnetic induction method and a magnetic resonance method, and only may wirelessly transmit power according to the magnetic induction method or only according to the magnetic resonance method with the first and second resonance frequencies.

Figure 11A:
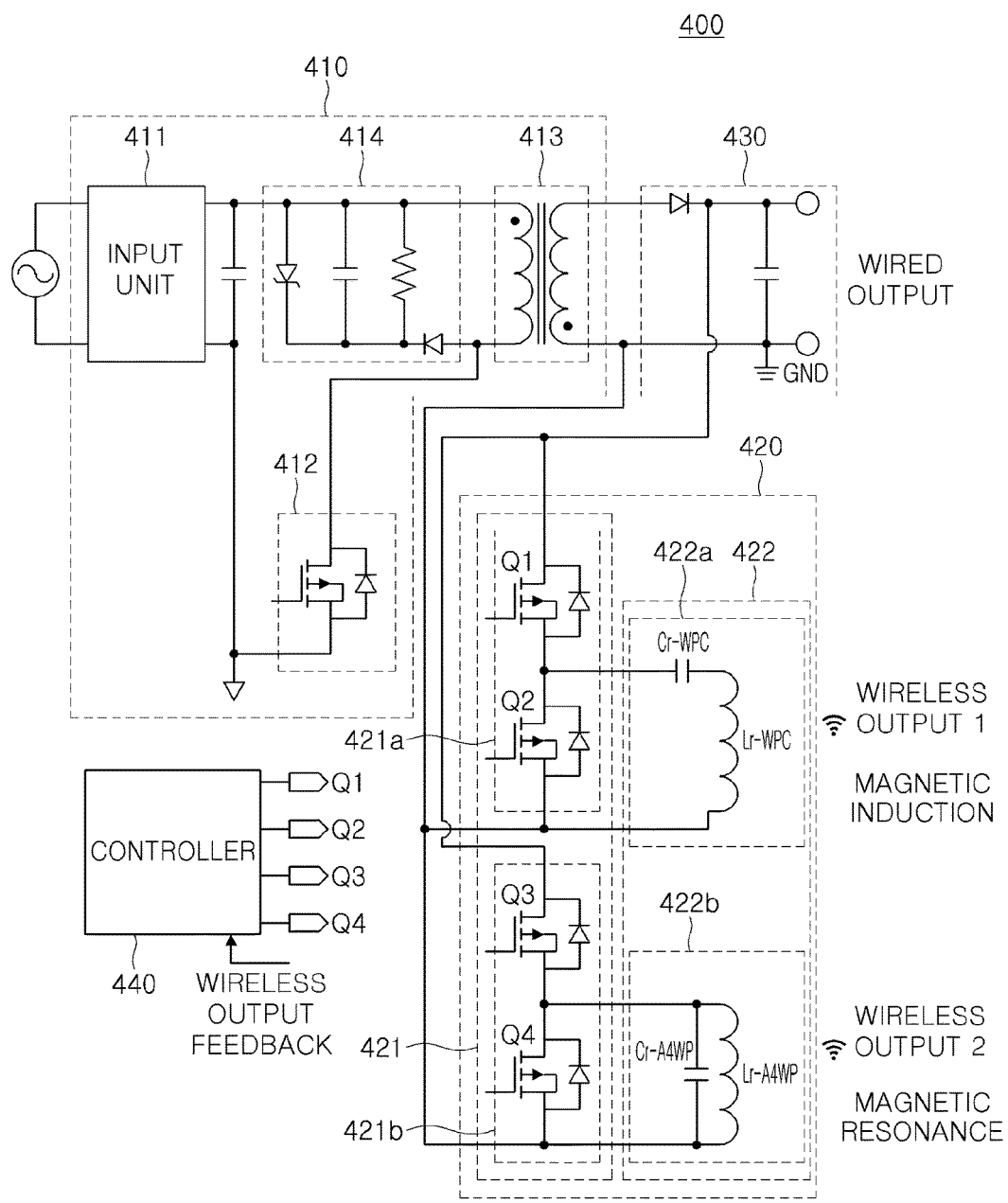
FIGS. 11A through 11C are circuit diagrams schematically illustrating detailed embodiments of resonance units employed in the fourth embodiment of the power supply device according to the present disclosure illustrated in FIG. 10.
Figure 11B:
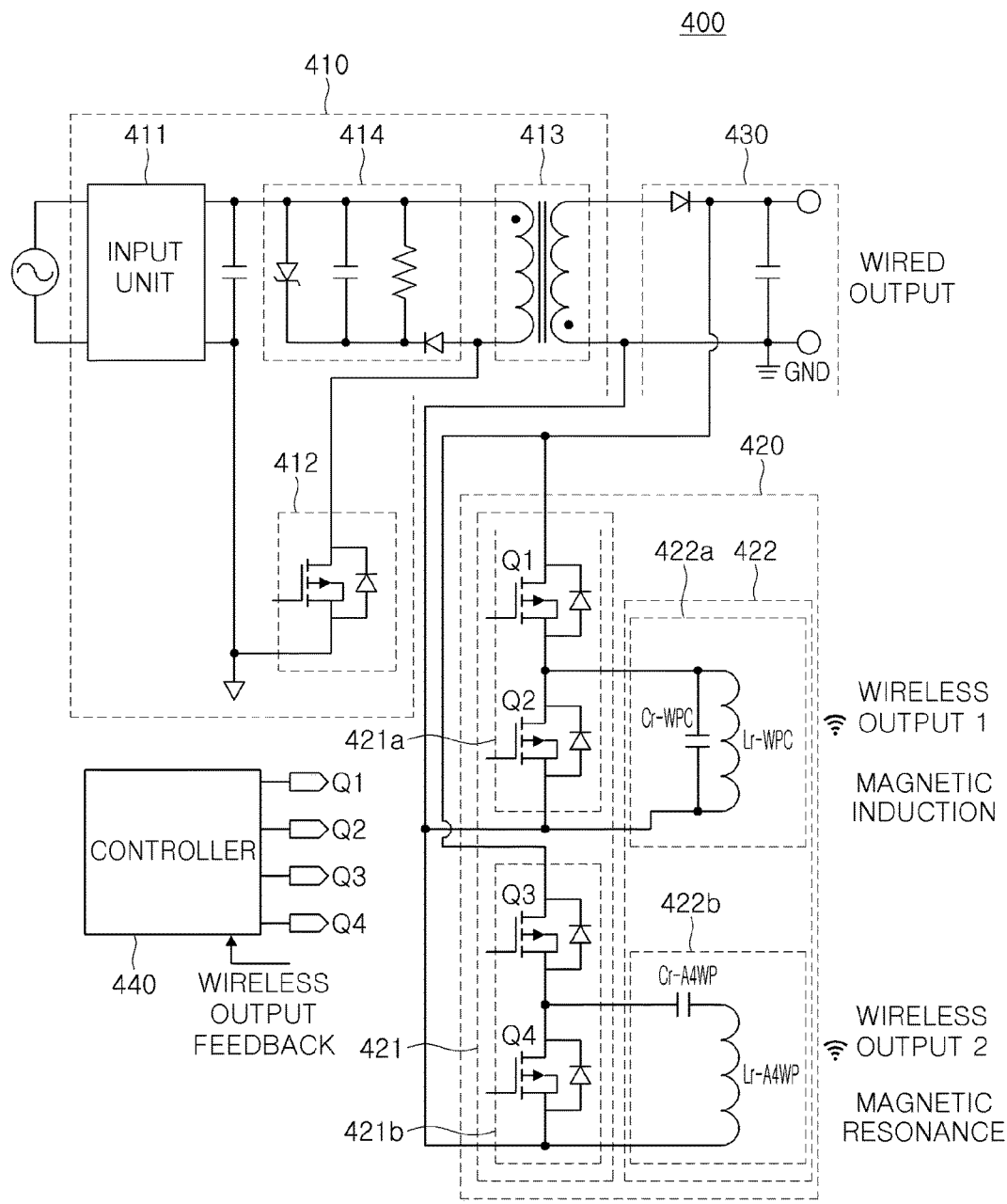
Figure 11C:
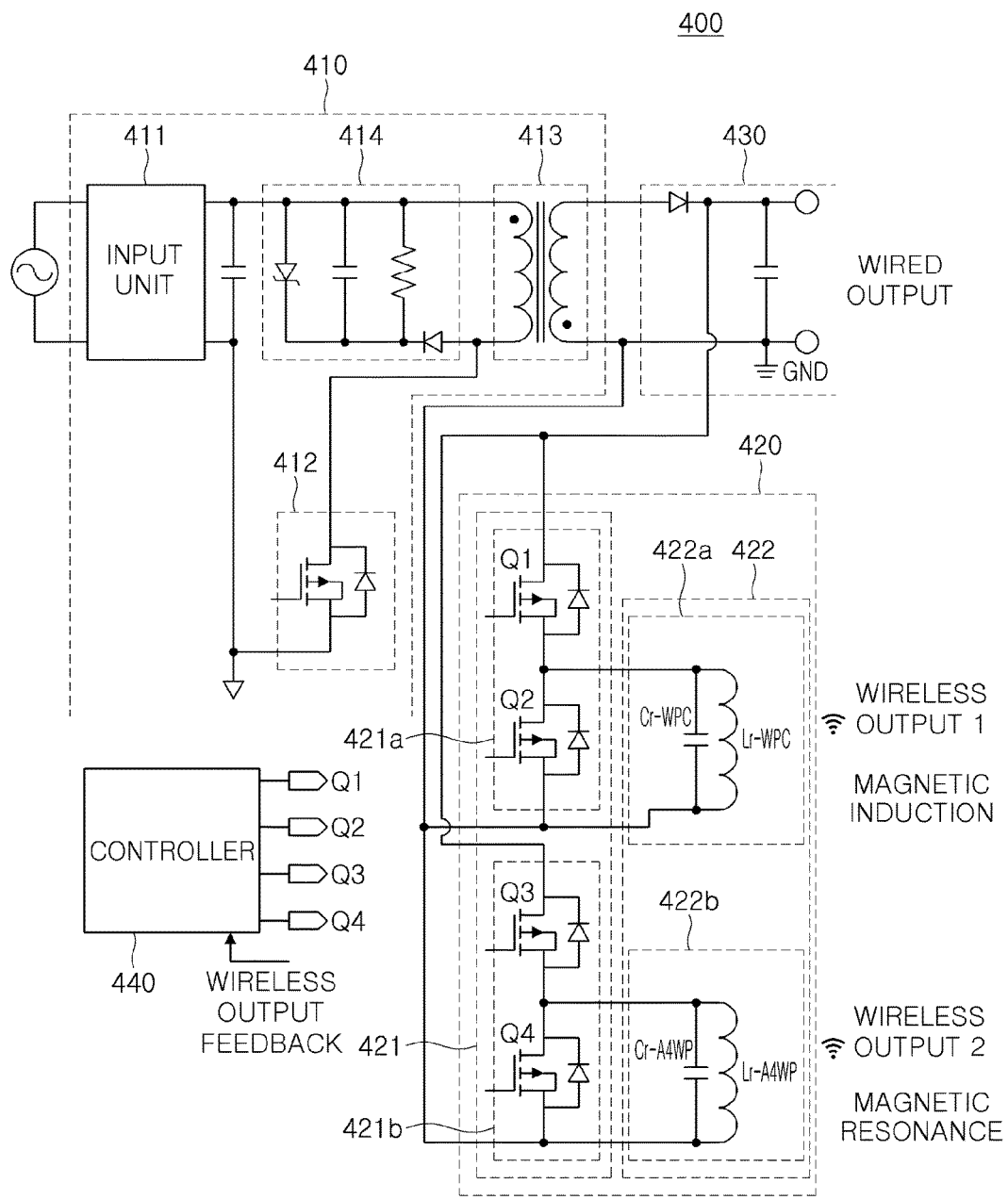

FIGS. 11A through 11C are circuit diagrams schematically illustrating detailed embodiments of resonance units employed in the fourth embodiment of the power supply device according to the present disclosure illustrated in FIG. 10.

Referring to FIGS. 11A through 11C, in the resonance unit 422 employed in the fourth embodiment 400 of the power supply device according to the present disclosure, the first capacitor Cr-WPC and the first power transmission coil Lr-WPC may be connected in series or in parallel, and similarly, the second capacitor Cr-A4WP and the second power transmission coil Lr-A4WP may be connected in series or in parallel.

Meanwhile, as described above, the controllers 140, 240, 340, and 440 in FIGS. 2 through 5 and 7, may control the resonance units 122, 222, 322, and 422 to wirelessly transmit power at at least one of the first and second resonant frequencies.

Figure 13:
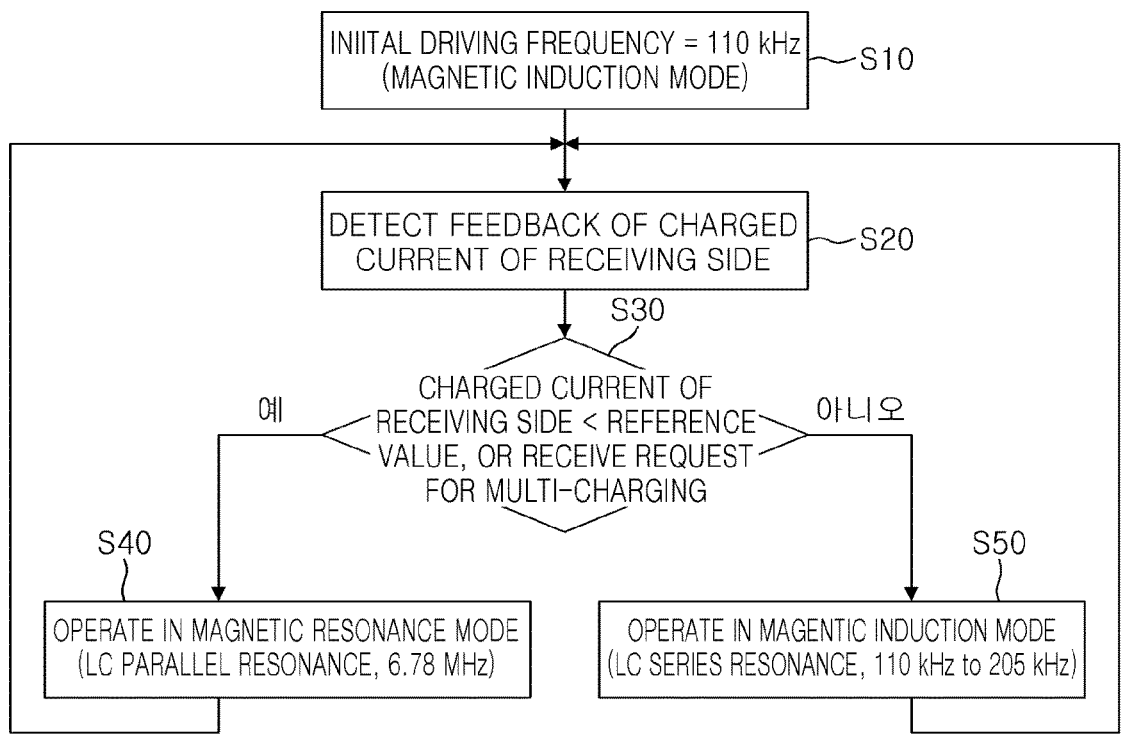
FIG. 13 is a flow chart illustrating operations of the power supply device according to an exemplary embodiment of the present disclosure.

FIG. 13 is a flow chart illustrating operations of the power supply device according to an exemplary embodiment in the present disclosure.

Referring to FIG. 13, first, the controllers 140, 240, 340, and 440 of the first to fourth embodiments 100, 200, 300, and 400 of the power supply device according to the present disclosure may control the wireless transmission of power at a first resonance frequency, for example, a resonance frequency having a frequency value ranging from 110 KHz to 205 KHz, at an initial stage of operation. Namely, the controllers 140, 240, 340, and 440 of the first to fourth embodiments 100, 200, 300, and 400 of the power supply device according to the present disclosure may wirelessly transmit power in a magnetic induction mode in operation S10.

Although not shown, according to circumstances, the controllers 140, 240, 340, and 440 of the first to fourth embodiments 100, 200, 300, and 400 of the power supply device according to the present disclosure may control wireless transmission of power at a second resonance frequency, for example, a resonance frequency of 6.78 MHz. Namely, the controllers 140, 240, 340, and 440 of the first to fourth embodiments 100, 200, 300, and 400 of the power supply device according to the present disclosure may wirelessly transmit power in a magnetic resonance mode.

Thereafter, when feedback of a charged current of a receiving side is detected in operation S20, the controllers 140, 240, 340, and 440 may compare the charged current of the receiving side with a preset reference value. In the case that the charged current of the receiving side is lower than the reference value due to a distance between the power supply device and a device being increased, according to the comparison result, or when a request for multi-charging is received in operation S30, the controllers 140, 240, 340, and 440 may control wireless transmission of power at the second resonance frequency, for example, with a resonance frequency band of 6.78 MHz. Namely, the controllers 140, 240, 340, and 440 may wirelessly transmit power in a magnetic induction mode in operation S50.

As described above, according to exemplary embodiments in the present disclosure, power may be transmitted wirelessly using at least two resonance frequencies, and in addition, since a wired scheme and a wireless scheme are integrated to supply power to various devices separately or simultaneously, various devices may be provided with power or charged with power and a single device may be quickly charged with power.

As set forth above, according to exemplary embodiments in the present disclosure, power may be transmitted wirelessly using at least two resonance frequencies, and in addition, a wired scheme and a wireless scheme are integrated to supply power to various devices separately or simultaneously.

While exemplary embodiments have been shown and described above, it will be apparent to those skilled in the art that modifications and variations could be made without departing from the scope of the invention as defined by the appended claims.

What is claimed is:

1. A power supply device comprising:
   a power conversion unit configured to convert input power into first power; and
   a wireless power supply unit configured to vary a switching frequency for switching the first power and wirelessly transmit the switched first power at one or more resonance frequencies,
   wherein the wireless power supply unit comprises a first capacitor and a second capacitor each configured to resonate with a first power transmission coil according to respective switching frequencies,
   wherein the wireless power supply unit comprises:
      a switching unit having at least one switch configured to switch the first power from the power conversion unit; and
      a resonance unit configured to resonate according to switching of the switching unit to wirelessly transmit the switched power,
   wherein the switching unit has a half bridge switch including a first switch and a second switch,
   wherein the resonance unit comprises the first capacitor, the second capacitor, and the first power transmission coil,
   wherein the first capacitor is connected to a node between the first switch and the second switch of the half bridge switch,
   wherein the first power transmission coil is connected to the first capacitor in series, and
   wherein the second capacitor is connected to the first power transmission coil in parallel.

2. The power supply device of claim 1, further comprising a controller configured to vary the switching frequency according to feedback information of the power wirelessly transmitted by the wireless power supply unit and selecting any one or any combination of any two or more of the resonance frequencies.

3. The power supply device of claim 1, wherein the first capacitor and the first power transmission coil are configured to resonate according to a switching frequency of the half bridge switch.

4. The power supply device of claim 1, wherein the first power transmission coil and the second capacitor are configured to resonate according to a switching frequency of the half bridge switch.

5. The power supply device of claim 1, wherein at least two resonance frequencies of the resonance unit work together with a switching frequency of the switching unit.

6. A power supply device comprising:
   a power conversion unit configured to convert input power into first power;
   a wired power supply unit configured to stabilize the first power from the power conversion unit and transmit the stabilized first power wiredly; and
   a wireless power supply unit configured to vary a switching frequency for switching the first power and wirelessly transmit the switched first power at either one or both of a first resonance frequency and a second resonance frequency,
   wherein the wireless power supply unit comprises a first capacitor and a second capacitor each configured to resonate with a first power transmission coil according to respective switching frequencies,
   wherein the wireless power supply unit comprises:
      a switching unit having at least one switch configured to switch the first power from the power conversion unit; and
      a resonance unit configured to resonate according to switching of the switching unit to wirelessly transmit the switched power,
   wherein the switching unit has a half bridge switch including a first switch and a second switch,
   wherein the resonance unit comprises the first capacitor, the second capacitor, and the first power transmission coil,
   wherein the first capacitor is connected to a node between the first switch and the second switch of the half bridge switch,
   wherein the first power transmission coil is connected to the first capacitor in series, and
   wherein the second capacitor is connected to the first power transmission coil in parallel.

7. The power supply device of claim 6, further comprising a controller configured to vary the switching frequency according to feedback information of the power wirelessly transmitted by the wireless power supply unit and selecting either one or both of the first resonance frequency and the second resonance frequency.

8. The power supply device of claim 6, wherein the first capacitor and the first power transmission coil are configured to resonate according to a switching frequency of the half bridge switch.

9. The power supply device of claim 6, wherein the first power transmission coil and the second capacitor are configured to resonate according to a switching frequency of the half bridge switch.

10. The power supply device of claim 6, wherein the first resonance frequency and the second resonance frequency of the resonance unit interwork with a switching frequency of the switching unit.

11. The power supply device of claim 6, wherein the first resonance frequency is formed by LC series resonance.

12. The power supply device of claim 6, wherein the second resonance frequency is formed by LC parallel resonance.

* * * * *